United States Patent [19]
Capelli

[11] 4,084,863
[45] Apr. 18, 1978

[54] BEARING AND BEARING LINER HAVING A COMPLIANT LAYER

[75] Inventor: Alfred J. Capelli, Palos Verdes Peninsula, Calif.

[73] Assignee: Sargent Industries, Inc., Los Angeles, Calif.

[21] Appl. No.: 436,670

[22] Filed: Jan. 25, 1974

[51] Int. Cl.$^2$ .................. C10M 5/00; B32B 3/00
[52] U.S. Cl. .................................. 308/238; 252/12;
308/DIG. 8; 308/72; 428/246; 428/252;
428/304; 428/306; 428/421; 428/425
[58] Field of Search .......... 308/3 R, 72, 238, DIG. 8;
428/246, 252, 304, 306, 421, 425; 252/12

[56] References Cited
U.S. PATENT DOCUMENTS

| | | | |
|---|---|---|---|
| 2,809,130 | 10/1957 | Rappaport | 308/238 |
| 3,037,893 | 6/1962 | White | 308/238 |
| 3,082,485 | 3/1963 | Thomas | 308/238 |
| 3,151,015 | 9/1964 | Griffith | 308/238 |
| 3,231,460 | 1/1966 | Andrews | 308/238 |
| 3,344,064 | 9/1967 | Brady et al. | 308/238 |
| 3,594,049 | 7/1971 | Turner | 308/72 |

*Primary Examiner*—James J. Bell
*Attorney, Agent, or Firm*—Ellsworth R. Roston

[57] ABSTRACT

A bearing liner for attachment to a substrate comprising a wear resistant layer and a compliant layer interposable between the wear resistant layer and the substrate. The wear resistant layer includes a binder, a lubricant distributed in the binder, and a fibrous material for increasing the strength of the wear resistant layer. The wear resistant layer has a wear surface. The compliant layer is deformable to permit the compliant layer to at least partially receive any projections in the substrate so that the tendency of any such projections to cause local protrusions of the wear surface is reduced.

21 Claims, 5 Drawing Figures

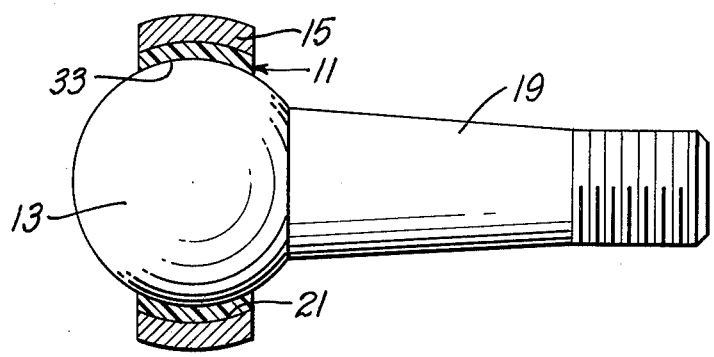
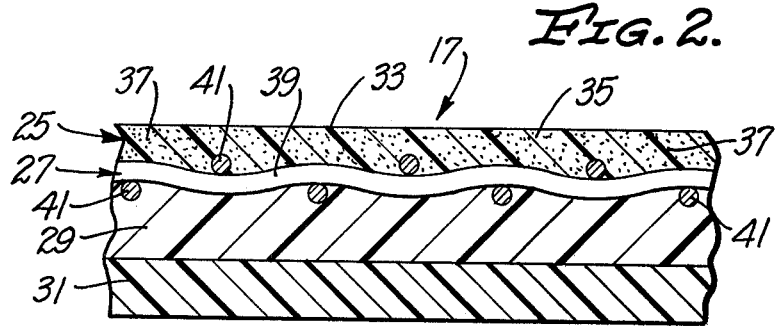
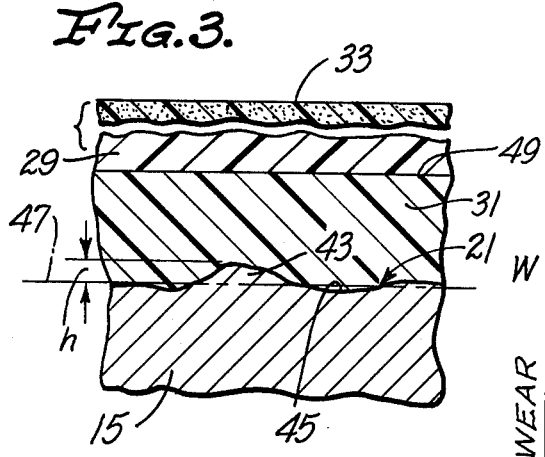
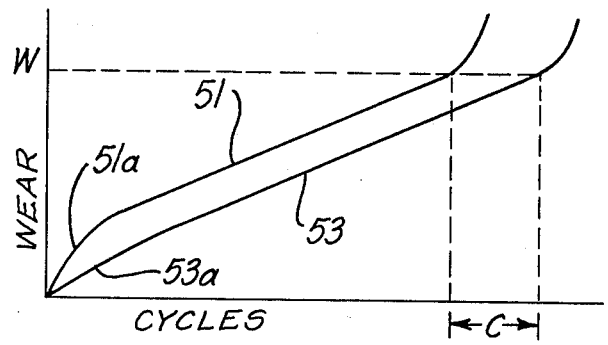
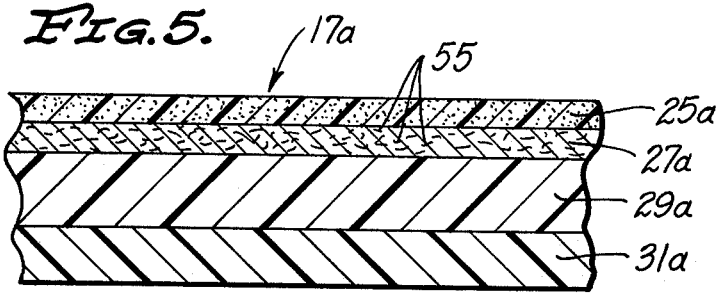

BEARING AND BEARING LINER HAVING A COMPLIANT LAYER

BACKGROUND OF THE INVENTION

A bearing liner is utilized between relatively movable members to provide a low friction, wear-resistant surface. Relative movement between the members inherently results in wear of the bearing liner and consequent reduction in its thickness. When the bearing liner has been thinned a predetermined amount, the bearing liner must be replaced.

The wear rate is the amount of thinning or wear of the bearing liner per cycle of movement of the relatively movable members. It is obviously desirable to reduce the wear rate to thereby increase the life of a bearing liner.

SUMMARY OF THE INVENTION

This invention is based, in part, upon the recognition of one particular problem which causes a high wear rate and the solution to this problem. Typically, a bearing liner is adhered to a substrate. The substrate is not highly polished and has numerous, minute projections. For example, these projections may have a maximum height of the order of 0.003 inch above the mean surface elevation of the substrate, i.e., the surface elevation of the substrate which has one-half of the substrate surface lying above it and one-half of the substrate surface lying below it. The bearing liner has a wear surface which is adapted to engage and slidably support another member which is movable relative to the substrate. In use, the bearing liner is compressively loaded between the substrate and this member.

Bearing liners of the type to which this invention is directed are deformable and thin. Thus, when the bearing liner is compressively loaded against the substrate, the projections on the substrate tend to locally deform the bearing liner by causing the wear surface to locally protrude. In other words, under the load the relatively thin bearing liner tends to assume the configuration of the underlying projections on the substrate.

As a consequence, the wear surface becomes irregular and includes numerous protrusions formed by the projections on the substrate. Initially, the member engaging the wear surface is supported substantially entirely by the relatively small area of the protrusions, and this results in very rapid initial wear, i.e., a high wear rate. The high initial wear rate continues until all of the protrusions have been worn off so that the wear surface presents a smooth, regular contour. This high initial wear rate materially reduces bearing liner life.

To solve this problem, the present invention provides a compliant layer between the substrate and the wear resistant portion of the bearing liner. The compliant layer provides a smoother surface than the surface of the substrate, and accordingly the tendency of the projections on the substrate to produce protrusions on the wear resistant portion of the bearing liner is substantially reduced or eliminated. By reducing the size and number of the protrusions on the wear resistant portion, the high initial wear rate which prior art bearing liners experience is substantially reduced.

The compliant layer reduces the size and number of protrusions in two ways. First, merely interposing the compliant layer between the relatively rough substrate and the wear resistant portion of the bearing liner reduces the transmission of any irregularity in the surface of the substrate to the wear surface. In other words, the compliant layer acts as a pad or protector between the relatively rough substrate surface and the wear surface to keep the wear surface relatively smooth. Secondly, the compliant layer deforms under load so that any irregularities in the wear surface are eliminated or further reduced when the bearing liner is supporting a load.

In order to function in either of the ways identified above, the compliant layer must be deformable so that it can at least partially receive any projection on the substrate. In addition, in order to perform the second of the above-noted functions, the compliant layer should be resiliently deformable, i.e., have a compressive modulus. By providing the compliant layer with a resiliently deformable characteristic, the compliant layer will flow laterally to even out any surface irregularities in the wear surface when it is loaded against a projection. For example, the material of the compliant layer may flow laterally of a projection to produce local thinning of the compliant layer at such projection. This enables the compliant layer to more effectively isolate the wear resistant portion of the bearing liner from the projection.

The compressive modulus of the compliant layer may be selected for each specific application. However, the compressive modulus should not be so low that the rated load carrying ability of the bearing liner is reduced. On the other hand, the compliant layer must be sufficiently deformable to adequately receive the projection of the substrate at a psi load level below the psi rating of the bearing liner. A preferred range of compressive modulus is 100,000 psi to 400,000 psi.

The ultimate compressive strength of the compliant layer should be no less than the load capacity of the bearing liner. If it is not, the load capacity of the bearing liner will be limited by the compliant layer rather than by the wear resistant portion of the bearing liner. In order to meet this requirement, the compliant layer should be relatively thin because very thin layers are more resistant to extrusion.

The compliant layer should preferably be as thick as the height of the tallest projection which would be expected to be encountered. Preferably, the thickness of the compliant layer should be 1½ to 2 times the height of the projections above the mean surface elevation of the substrate. For many applications, the compliant layer should be at least 0.005 inch thick. The thickness of the compliant layer should not be so great that the total deflection thereof under normal operating conditions results in the bearing liner losing its rated load carrying ability.

The compliant layer may be constructed of any material which will fulfil the parameters noted above. For example, the compliant layer may be constructed of polyurethane, butyl rubber or silicone rubber. On the other hand, the compliant layer should not be very hard and rigid because it should be capable of deforming to generally conform to the surface irregularities of the substrate. For example, hard metal should not be used. In addition, a thick layer of hard adhesive unfilled with other material would be too brittle to serve as the compliant layer. The compliant layer would ordinarily be of a material other than the material from which the substrate is constructed.

Not all bearing or bearing liners require protection of the type afforded by the present invention. Thus, hard, rigid metal bearings do not require protection from projections on the substrate on which they are mounted because the projections are incapable of forming protrusions on the wear surface of such rigid metal bearings. Similarly, a bearing liner which is cast in situ would not require a compliant layer. However, bearing liners which are subject to being deformed by the projections of the substrate if applied directly to the substrate can advantageously use a compliant layer. For example, relatively thin bearing liners of the type which include a binder, a lubricant distributed in the binder, and a fibrous material for increasing the strength of the bearing liner do require the protection provided by this invention in order to minimize or eliminate high initial wear.

The invention can best be understood by reference to the following description taken in connection with the accompanying illustrative drawing.

BRIEF DESCRIPTION OF THE DRAWINGS

FIG. 1 is an elevational view partially in section of a bearing having a bearing liner constructed in accordance with the teachings of this invention embodied therein.

FIG. 2 is an enlarged, fragmentary sectional view through one form of bearing liner constructed in accordance with the teachings of this invention.

FIG. 3 is an enlarged, fragmentary sectional view illustrating how the compliant layer deforms under load to accommodate the projections of the substrate.

FIG. 4 is a plot of typical wear rates for a prior art bearing liner and the bearing liner of this invention.

FIG. 5 is an enlarged, fragmentary sectional view similar to FIG. 2 illustrating a second form of bearing liner constructed in accordance with the teachings of this invention.

DESCRIPTION OF THE PREFERRED EMBODIMENTS

FIG. 1 shows a bearing 11 which includes a ball 13, a race 15, and a bearing liner 17 interposed between the ball and race. The ball 13 is substantially spherical and has a rod 19 affixed thereto for the purpose of attaching the ball to external structure (not shown).

The race 15 may be attached to other external structure (not shown) in any suitable manner. The race 15 has an internal spherical surface 21 to which the bearing liner 17 is bonded. Thus, the race 15 serves as a substrate for the bearing liner 17. The bearing liner 17 has a smooth internal wear surface 33 of spherical configuration which slidably cooperates with the ball 13. In this manner, the ball 13 and the race 15 are mounted for relative pivotal movement about an infinite number of axes. Although the bearing liner 17 is illustrated in FIG. 1 as being utilized between the ball 13 and the race 15, it should be understood that the bearing liner 17 may be used in other kinds of bearings.

One form of the bearing liner 17 is shown in FIG. 2. The bearing liner 17 includes a low friction layer 25, fibrous material in the form of a fabric backing member 27, an adhesive layer 29, and a compliant layer 31. Except for the presence of the compliant layer 31, the bearing line 17 may be identical to the bearing liner described in common assignee's U.S. Pat. No. 3,594,049 which is incorporated by reference herein.

The low friction layer 25 defines the wear resistant wear surface 33. The low friction layer 25 includes a binder 35 and lubricant particles 37 evenly distributed throughout the binder 35. The binder 35 must be constructed of a material which is capable of binding or holding the lubricant particles 37 together. For example, a phenolic base, thermosetting, two-stage adhesive which provides a strong chemical bond may be employed as the binder 35.

The lubricant particles 37 may include any self-lubricating material which can be embodied in powdered form or any liquid lubricant which is suitable for microencapsulation in accordance with common assignee's copending application Ser. No. 403,453, entitled "Bearing Material With Microencapsulated Lubricant", filed Oct. 4, 1973 now U.S. Pat. No. 3,950,047, and naming Alfred J. Capelli as the inventor. Examples of self-lubricating material include polytetrafluoroethylene (commonly designated by the trademark "Teflon"), fluoroethylenepropylene, polyethylene, graphite, molybdenum disulfide, Nylon, and Dacron. The lubricant particles 37 should be finely divided and may be, for example, five micron Teflon pure powder.

Although the backing member 27 may take different forms, in the embodiment illustrated in FIG. 2, it is in the form of a woven cloth and may be constructed, for example, of Dacron or Nylon. The backing member 27 includes warp strands 39 (only one being illustrated) and a plurality of filler strands 41 interwoven with the warp strands. The primary functions of the backing member 27 are to impart strength to the bearing liner 17 and to provide an irregular or porous surface to which the low friction layer 25 can be applied. The low friction layer 25 and the backing member 27 combine to form what may be regarded as the wear resistant layer or portion of the bearing liner 17.

The adhesive layer 29 is preferably constructed of the same material as the binder 35. The adhesive layer 29 provides support for the backing member 27 and bonds the compliant layer 31 to the remainder of the bearing liner.

To maximize wear life, the thickness of the low friction layer 25 should be between 0.0025 and 0.0035 inch with 0.003 inch being considered optimum. The thickness of the low friction layer 25 is measured from the peaks of the projections formed on the backing member 27 to the wear surface 33. The thickness of the portion of the bearing liner 17 between the outermost portions of the projections formed by the backing member 27 and the interface between the adhesive layer 29 and the compliant layer 31 may be, for example, about 0.011 inch. The backing member 27 may be about 0.006 inch thick.

The internal surface 21 of the race 15 is not highly polished. Consequently, the internal surface 21 is irregular and includes numerous projections 43 and valleys 45 (FIG. 3). Each of the projections 43 (only one being shown in FIG. 3) has a height $h$ above the mean surface elevation 47 of the surface 21.

The primary purpose of the compliant layer 31 is to isolate the other portions of the bearing liner 17 from the irregularities of the surface 21 and in particular the projections 45. Although a variety of materials may be employed for the compliant layer 31, in the embodiment shown in FIG. 2, it is selected from the group consisting of polyurethane, butyl rubber, and silicone rubber.

The material for the compliant layer 31 can be selected in accordance with the parameters discussed hereinabove. By way of example, for a substrate having projections of 0.003 inch above the mean surface elevation, a polyurethane compliant layer having a thickness of 0.0045 inch and a compressive modulus of 100,000 may be utilized.

The compliant layer 31 is preferably coextensive with the other portions of the bearing liner 17 to which it is adhered. The compliant layer can be joined to the surface 21 in any suitable manner such as by an adhesive.

Merely interposing the compliant layer 31 between the wear surface 33 and the surface 21 tends to reduce the transmission of the irregularities of the surface 21 to the wear surface 33. In addition, when a load is applied to the wear surface 33, the compliant layer 31 is compressed between the surface 21 and the ball 13. If the wear surface 33 contains any irregularities, whether as a result of the projections 43 and the recesses 45 or from other causes, the resiliently deformable compliant layer 31 deforms to allow any irregularities on the wear surface 33 to be smoothed out. Specifically, the material of the compliant layer 31 flows or spreads laterally of each of the projections 43. Because the compliant layer 31 thins locally at each of the projections 43, the outer surface 49 of the compliant layer and the wear surface 33 are much smoother and flatter than the irregular surface 21. Accordingly, under load, the projections 43 do not cause protrusions on the wear surface 33 and the recesses 45 do not produce recesses in the wear surface 33.

As the wear surface 33 is smooth from the outset, the high initial wear characteristically experienced with bearing liners is substantially reduced. The reason is that the load applied to the bearing liner 17 by the ball 13 can be carried by substantially the full area of the wear surface 33 rather than by the protrusions which would ordinarily be formed by the projections 43.

The effect of reducing initial wear is illustrated graphically in FIG. 4. FIG. 4 is a plot of wear or thinning in inches versus the number of cycles of movement to which the bearing liner is subjected. A curve 51 is representative of a prior art bearing liner which does not have the compliant layer 31, and a curve 53 is representative of the wear rate of the bearing liner 17 as shown in FIG. 2. The curves 51 and 53 have high wear regions 51a and 53a, respectively; however, the initial wear rate of the region 51a substantially exceeds the initial wear rate shown by the region 53a. Accordingly, the bearing liner of this invention reaches the total allowable wear W in a greater number of cycles than the prior art bearing liner, and this is represented by the cycles C in FIG. 4. In other words, the C dimension in FIG. 4 graphically represents the increase in wear life obtainable by utilizing the compliant layer 31.

It should be understood that use of the compliant layer is not limited to the bearing liner shown in FIG. 2. Rather, the compliant layer 31 may be employed with any bearing liner which should be protected from the projections 43.

FIG. 5 illustrates by way of example another bearing liner 17a constructed in accordance with the teachings of this invention. Portions of the bearing liner 17a corresponding to portions of the bearing liner 17 are designated by corresponding reference numerals followed by the letter a. One advantage of the embodiment of FIG. 5 is that the stress-strain characteristics of the bearing liner 17a are more nearly linear than with the embodiment of FIG. 2.

The bearing liner 17a is identical to the bearing liner 17 except that the backing member 27a is composed of randomly oriented fibers 55 matted together to form a fibrous mat such as paper. Except for the presence of the compliant layer 31a, the bearing liner 17a is identical to the bearing liner described in common assignee's application Ser. No. 274,606, filed July 24, 1972, entitled "Bearing Liner", and naming Peter H. Turner as the inventor. This application is incorporated by reference herein.

The backing member 27a is preferably compressed to reduce its porosity. The fibers 55 can take different forms although compressed vegetable fibers commonly available in the form of paper are particularly advantageous and economical. Calendared paper and rice paper contain highly compressed fibers and are desirable for this purpose. The backing member 27a can comprise one or more layers of paper.

The bearing liner 17a may be substituted for the bearing liner 17 in the construction shown in FIG. 1. Like the bearing liner 17, the bearing liner 17a can also be employed in bearing structures other than that illustrated in FIG. 1. When incorporated into a bearing structure, the compliant layer 31a functions in the same manner as the compliant layer 31.

Although exemplary embodiments of this invention have been shown and described, many changes, modifications and substitutions may be made by those with ordinary skill in the art without necessarily departing from the spirit and scope of this invention.

I claim:

1. A bearing liner for attachment to a substrate having at least one projection thereon, said bearing liner comprising:

a wear resistant layer including a porous backing member and a binder and particles of a lubricating material dispersed in the binder, said wear resistant layer having a wear surface;

said wear resistant layer being relatively thin and being provided with properties to be deformable under load whereby application of said wear resistant layer directly to said substrate would cause the projection to cause a protrusion on the wear surface; and a compliant layer disposed between the wear resistant layer and the substrate, said compliant layer being relatively thin and being provided with resiliently deformable properties to provide for resilient compression of the compliant layer at the position of the projection whereby the tendency of the projection to cause the protrusion is minimized;

the thickness of the compliant layer being at least as great as the height of the projection on the substrate but less than twice the height of the projection on the substrate.

2. In a bearing including a substrate having an irregular surface and further including a thin and deformable wear resistant layer having a wear surface wherein the wear resistant layer is of the type which would be deformed by the irregular surface of the substrate upon loading of the wear resistant layer against the irregular surface, the wear resistant layer including a porous backing member and particles of a lubricant mechanically supported in the pores of the backing member, the improvement comprising:

a thin and compliant layer interposed between the wear resistant layer and the substrate, said compliant layer being resiliently deformable to minimize the transmission of the irregulatities of said irregular surface to the wear surface without reducing the load carrying capabilities of the wear resistant layer;

the thickness of the thin and compliant layer being between approximately one (1) and two (2) times the height of the irregular surface.

3. A bearing liner for attachment to a substrate having projections extending from the substrate to provide deviations from a desired configuration of the substrate, comprising:

a thin wear resistant layer including a binder, a lubricant formed from particles dispersed in said binder, and a porous material providing a backing for the binder and the lubricant and for mechanically supporting the lubricant in the pores to increase the strength of said wear resistant layer;

said wear resistant layer having a wear surface; and a thin compliant layer disposed between the wear resistant layer and the substrate, said compliant layer being resiliently deformable to provide for the reception by said compliant layer of the projections in the substrate whereby the tendency of any such projections to cause a local protrusion of the wear surface is minimized, the thickness of the compliant layer being at least 0.005 inches but not so great that the deflection of the compliant layer results in reductions in the particular load carrying capacity of the wear resistant layer;

the wear resistant layer having a particular load carrying capacity of said compliant layer being provided with an ultimate compressive modulus sufficiently great so as not to reduce the particular load carrying capacity of the wear resistant layer but sufficiently low so that it will receive the projections of the substrate.

4. A bearing liner as defined in claim 3 wherein said compliant layer is constructed from a material selected from a group consisting of polyurethane, butyl rubber, and silicone rubber.

5. A bearing liner for attachment to a substrate having projections extending from the substrate comprising:

a thin and deformable wear resistant layer including a binder, a lubricant defined by particles and dispersed in said binder, and a porous backing mechanically supporting the lubricant particles in the pores of the backing for increasing the strength of said wear resistant layer, said wear resistant layer having a wear surface including the binder and the lubricant particles;

a thin compliant layer fixable to said substrate;

means joining said compliant and wear resistant layers together with said wear surface being at least partially exposed; and said compliant layer being at least one and one-half (1½) times the height of the projections on the substrate and elastically deformable whereby, upon forcing the compliant layer against the substrate, the projections on the substrate cause flow of the compliant layer laterally of the projection to produce local thinning of the compliant layer at the position of the projections to thereby reduce the effect of such projections on the wear surface.

6. A bearing liner as defined in claim 5 wherein said porous backing includes a fabric layer having first and second generally oppositely directed faces, said binder and said lubricant particles being applied to said first face to define the wear surface, and said binder being applied to said second face to join the wear resistant layer and the compliant layer.

7. A bearing liner as defined in claim 5 wherein said porous material includes a mat of randomly oriented fibers.

8. A bearing comprising:

means defining a substrate having a means surface elevation and having at least one projection thereon, said projection having a predetermined height above the mean surface elevation of the substrate;

a thin and deformable wear resistant layer including a binder, a lubricant defined by particles dispersed in the binder, and a porous backing mechanically supporting the lubricant particles in the pores of the backing for increasing the strength of said wear resistant layer, said resistant layer having a wear surface including the binder and the lubricant particles;

a thin and resiliently compliant protective layer disposed between the substrate and the wear resistant layer to protect the wear resistant layer from said projection, said protective layer being joined to the substrate and to the wear resistant layer; and said protective layer having a thickness greater than said predetermined height, said protective layer having properties of being locally deformable and locally thinnable by said projection, whereby the effect of the projection on the wear surface is reduced.

9. A bearing as defined in claim 8 wherein the thickness of said protective layer is at least one and one-half times said predetermined height of the projection.

10. A bearing as defined in claim 9 wherein said protective layer is constructed of a material selected from a group consisting of polyurethane, butyl rubber, and silicone rubber, and said porous backing includes a layer or randomly oriented fibers having first and second faces, said dispersion of said binder and said lubricant particles being applied to said first face to define the wear surface, and said binder being applied to said second face for joining said protective layer to said wear resistant layer.

11. A bearing liner as set forth in claim 1 wherein the porous backing constitutes a woven fabric and the lubricating particles constitute one of a powder or frangible micro capsules filled with a lubricating material.

12. A bearing liner as set forth in claim 3 wherein the lubricating particles constitute one of a dry powder or frangible micro capsules filled with a lubricating fluid.

13. A bearing liner as set forth in claim 3 wherein the porous backing constitutes one of a woven fabric or randomly oriented fibers matted to form a fibrous mat.

14. A bearing liner as set forth in claim 6 wherein the porous backing includes a woven fabric and the wear resistant layer has a particular load carrying capability and the compliant layer has properties of elastic deformation for retaining the particular load carrying capability of the wear resistant layer.

15. A bearing as defined in claim 9 wherein the thickness of said protective layer is at least one and one half times said predetermined height of the projection, said protective layer is constructed of a material selected from a group consisting of polyurethane, butyl rubber and silicone rubber and said porous backing includes a woven fabric having first and second faces, said dispersion of said binder and said lubricant particles being applied to said first face to define the wear surface, and said binder being applied to said second face for joining said protective layer to said wear resistant layer.

16. A bearing liner as defined in claim 10 where the lubricant particles constitute one of a powder or frangible micro capsules filled with lubricating material.

17. A bearing liner as defined in claim 15 wherein the lubricant particles constitute one of a powder or frangible micro capsules filled with lubricating material.

18. In the wear resistant layer set forth in claim 1 wherein the particles of the lubricating material extend a few thousandths of an inch above the surface of the porous backing member and the compliant layer has a thickness of a few thousandths of an inch.

19. A bearing liner as set forth in claim 3 wherein the particles of the lubricant extend a few thousandths of an inch above the surface of the porous material and the compliant layer has a thickness of a few thousandths of an inch.

20. In the wear resistant layer set forth in claim 18, the lubricating material constituting a polytetrafluoroethylene powder and the compliant layer being provided with properties to provide an ultimate compressive strength at least as great as the load carrying capacity of the wear resistant layer.

21. A bearing liner for attachment to a substrate having projections extending from the substrate to provide deviations from a desired configuration of the substrate, comprising:

a thin wear resistant layer including a binder, a lubricant formed from particles dispersed in said binder, and a porous material providing a backing for the binder and the lubricant and for mechanically supporting the lubricant in the pores to increase the strength of said wear resistant layer;

said wear resistant layer having a wear surface; and a thin compliant layer disposed between the wear resistant layer and the substrate, said compliant layer being resiliently deformable to provide for the reception by said compliant layer of the projections in the substrate whereby the tendency of any such projections to cause a local protrusion of the wear surface is minimized, the thickness of the compliant layer being at least 0.005 inches but not so great that the deflection of the compliant layer results in reductions in the particular load carrying capacity of the wear resistant layer.

* * * * *